(12) United States Patent
Grossele

(10) Patent No.: US 6,637,999 B2
(45) Date of Patent: Oct. 28, 2003

(54) ECOLOGICAL CARRIAGE FOR DRUMS

(75) Inventor: Massimo Grossele, Vicenza (IT)

(73) Assignee: Gromet s.n.c. di Grossel Massimo & C., Rosa' (IT)

( * ) Notice: Subject to any disclaimer, the term of this patent is extended or adjusted under 35 U.S.C. 154(b) by 0 days.

(21) Appl. No.: 10/014,144

(22) Filed: Nov. 29, 2001

(65) Prior Publication Data

US 2002/0154979 A1 Oct. 24, 2002

(30) Foreign Application Priority Data

Dec. 1, 2000  (IT) ...................................... VI2000A0264

(51) Int. Cl.$^7$ ................................................. B62B 3/04
(52) U.S. Cl. ........................................ 414/421; 414/469
(58) Field of Search ................................ 414/421, 469, 414/490, 539, 642; 280/79.5, 79.6; 220/573; 141/88

(56) References Cited

U.S. PATENT DOCUMENTS

| 861,848 | A | * | 7/1907 | Herreid | 248/129 |
|---|---|---|---|---|---|
| 1,867,446 | A | * | 7/1932 | Doubek | 414/469 |
| 2,808,948 | A | * | 10/1957 | Schonrock | 414/469 |
| 3,027,032 | A | * | 3/1962 | Selby | 414/648 |
| 3,685,674 | A | * | 8/1972 | Bruer et al. | 414/421 |
| 4,738,582 | A | * | 4/1988 | Roberts | 414/546 |
| 4,744,701 | A | * | 5/1988 | Chasteen | 406/39 |
| 5,364,224 | A | * | 11/1994 | Padgett | 414/703 |
| 5,417,344 | A | * | 5/1995 | Wells et al. | 220/571 |
| 5,480,191 | A | * | 1/1996 | Litin et al. | 280/831 |
| 5,813,680 | A | * | 9/1998 | Shaw et al. | 280/47.26 |

FOREIGN PATENT DOCUMENTS

| JP | 5-294402 | * | 11/1993 | ................. 414/469 |
|---|---|---|---|---|

* cited by examiner

*Primary Examiner*—James W. Keenan
(74) *Attorney, Agent, or Firm*—Bucknam and Archer

(57) ABSTRACT

An ecological carriage for drums is described which is constituted by a metallic structure and a basin. The drum is disposed with an horizontal axis and rests on the metallic structure. The basin is below the drum and functions as a bowl to collect fluids, mineral oils and similar fluids which are lost or spilled during the decanting or due to rupture of the drum. This assembly is mounted on a base provided with wheels. The carriage is characterized by the fact that the structure supporting the drum is capable of rotating from a position essentially horizontal to a position essentially vertical and vice versa.

11 Claims, 4 Drawing Sheets

ECOLOGICAL CARRIAGE FOR DRUMS

FIELD OF THE INVENTION

The present invention relates to an ecological carriage for transporting drums or barrels.

BACKGROUND OF THE INVENTION

According to the present state of the art, the carriages for the transportation of drums or barrels are essentially constituted by a metallic structure on which the drum rests, the drum being disposed with an horizontal axis and by a basin located under the drum, the basin being used to collect the fluids such as mineral oil and similar fluids which are lost during the decanting or or due to rupture of the drum, all these components being mounted on a base provided with wheels.

Actually, with the carriages presently being used the loading of the drum requires the use of a mule driver which removes the drum from the storehouse where it is found in the vertical position and deposits it in the horizontal position on top of the carriage.

SUMMARY OF THE INVENTION

A first object of the invention is to provide a carriage for drums which carries out the loading operation automatically without the need of the mule driver or other mechanical devices for raising and transporting the drum.

A further object of the invention is to provide a carriage for automatically loading drums, of simple construction, of easy and sure manageability.

Still another object of the invention is to provide a carriage for drums capable of automatic loading which does not require particular servicing.

These objects are achieved with an ecological carriage for drums in which the support structure of the drums is capable of rotating from a position essentially horizontal to a substantially vertical position and vice versa. In this manner, at the beginning of the operation of loading of the drum the carriage is approached to the drum to be moved in a manner that its mobile structure positioned vertically may be hooked to the drum which is disposed vertically.

Subsequently, the structure rotates on itself by 90 degrees, so that the drum hooked to the structure and supported by it, takes a horizontal position, above the base of the carriage.

A further characteristic of the invention is to provide that a basin for collecting the liquid lost or spilled from the drum slides so that it takes a position completely under the drum when the drum is in a horizontal position and will take a lateral position to allow the drum to take again a vertical position.

BRIEF DESCRIPTION OF THE DRAWINGS

These and other characteristics of the invention are better appreciated by the description of possible embodiments provided as non-limiting examples for illustration, by reference to the accompanying drawings, of which.

DESCRIPTION OF THE PREFERRED EMBODIMENT

Figure 1:
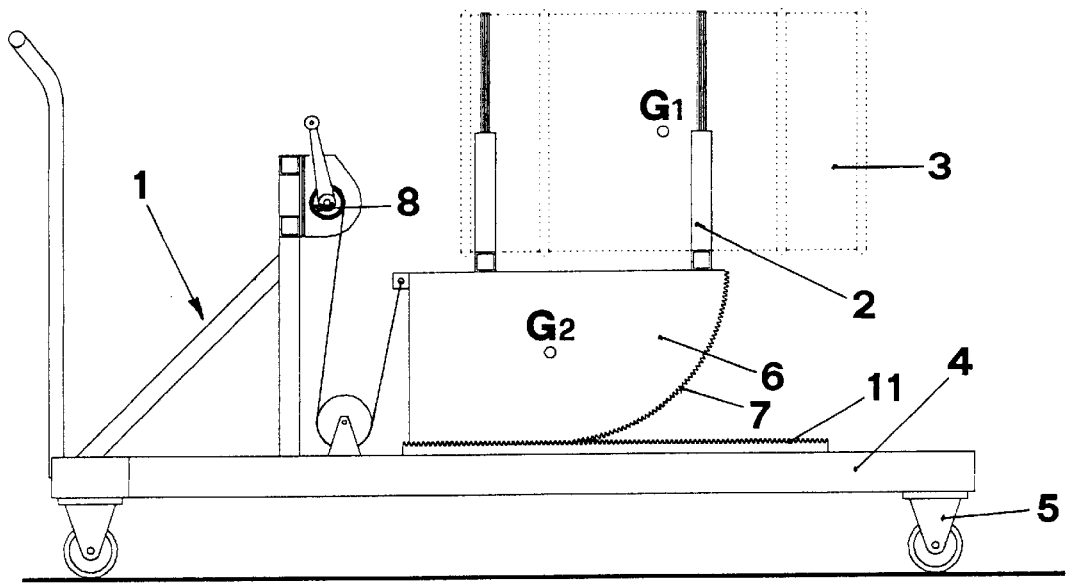
FIGS. 1 and 2 show frontal elevational views of the carriage of the invention with the drum respectively in the horizontal and vertical positions.

As shown in the figures, the carriage (1) of this invention comprises a metallic structure (2) on which the drum (3) is anchored, the drum resting on the base (4) which is provided with wheels (5). The metallic structure (2) is supported on the base (4) by means of two shoulders (6) which are shaped according to an arcuate profile so as to render the structure horizontally pivoted to the maximum up to an angle of 90°.

Figure 2:
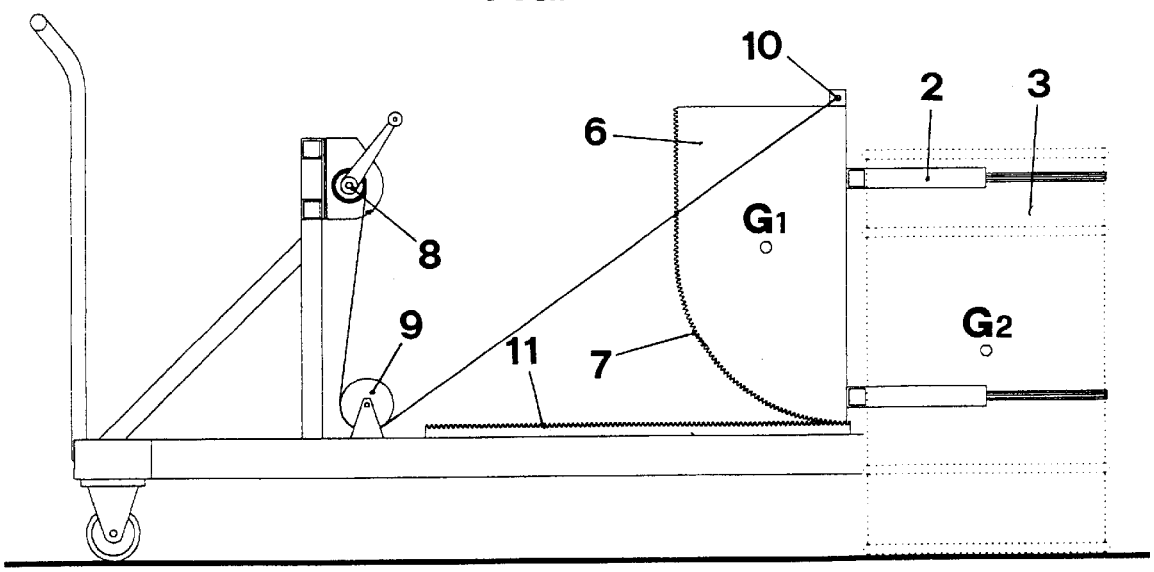

As shown in FIGS. 1 and 2, in the first embodiment the action of horizontally pivoting of structure (2) is generated because drum (3) is mounted in a manner such that its center of gravity "G1" is always displaced towards the exterior with respect to the center of gravity "G2" of shoulder (6).

The gravitational horizontal pivoting of structure (2) which has the tendency of moving drum (3) from the horizontal position to the vertical position is opposed and regulated by means of a maneuver carried out by the operator, of winch (8) manually or motorized, integral with the base of the carriage and connected by means of return roll (9) to nib (10) formed in suitable position on plate (6).

Analogously, in order to bring drum (3) from the vertical position (FIG. 2) corresponding to its resting on the ground, to the horizontal position above the carriage (FIG. 1), the operator always operates with winch (8) wrapping the cord and engaging shoulders (6) to slide with their arcuate profile (7) on the fixed base up to the point when they are brought to the horizontal position.

In order to assure the stability of the metallic structure (2) during its rotation there is provided the use of a tooted transmission obtained with the application of a fixed rack (11) which engages with the arcuate area (7) provided with teeth.

Figure 3:
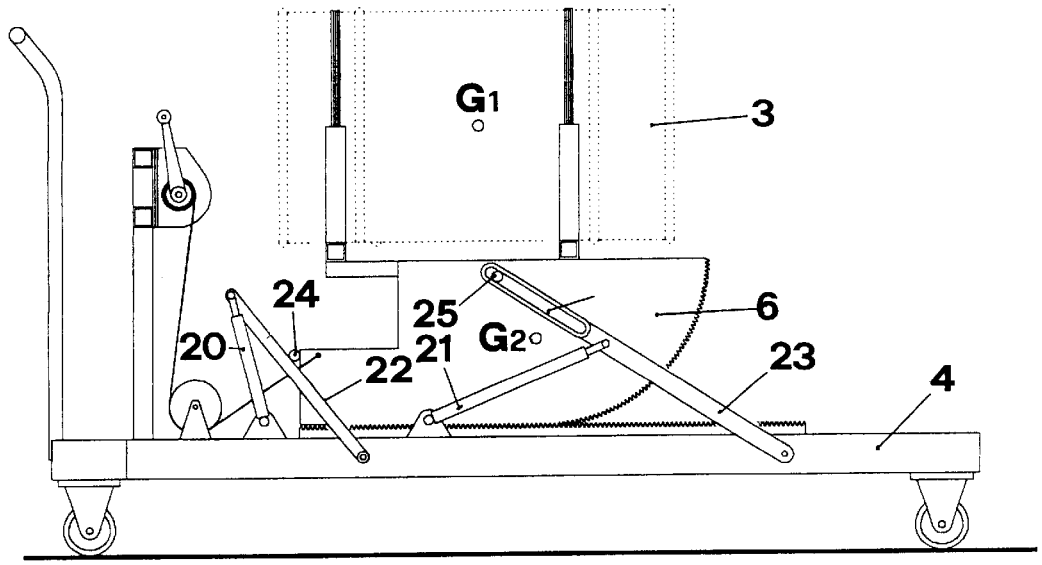
FIGS. 3 and 4 show elevational frontal views of a second embodiment of the carriage of this invention with the drum respectively in the horizontal and vertical positions.
Figure 4:
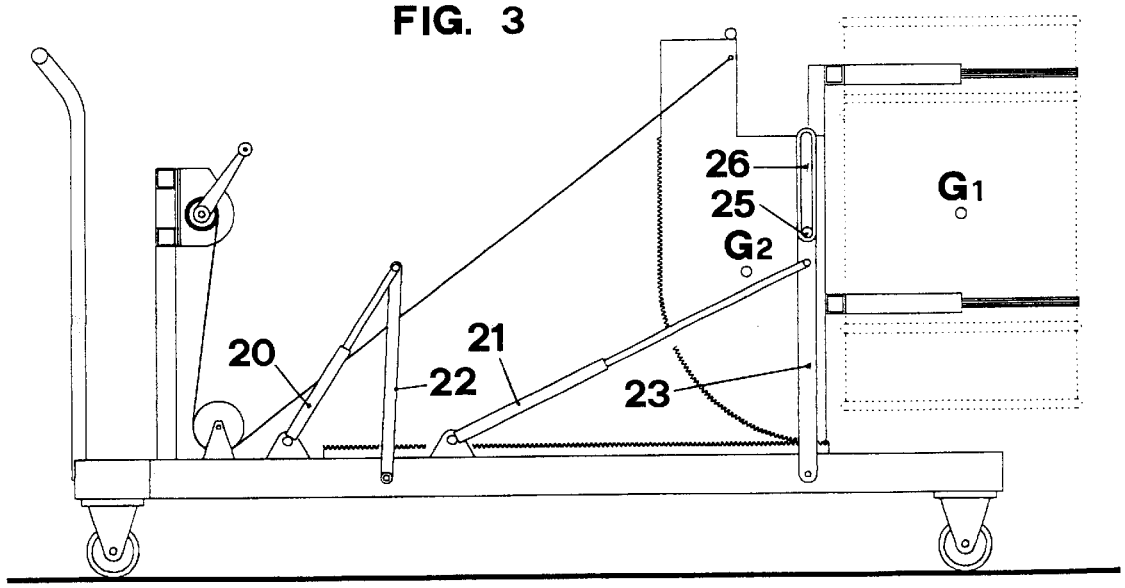

As shown in FIGS. 3 and 4, in a second embodiment to be utilized for moving drums (3) in a manner that when they are placed horizontally their center of gravity "G1"is placed internally with respect to the center of gravity "G2" of shoulder (6) and to render easier the action of horizontal pivoting of the entire structure when it does not have the drum, there are used two crank gears constituted by two gas pistons (20) and (21) which act on two arms or levers (22) and (23), the pistons and the arms being anchored on the structure of base (4). Specifically, the crank gear composed by piston (20) and lever (22) acting by pushing on pin (24) applied on shoulder (6) achieves the initial angular rotation of the shoulder.

Analogously the crank gear composed of piston (21) and lever (23) regulates the entire action of horizontal pivoting of the shoulder by means of pawl (25). The pawl is integral with the shoulder and slides within guide (26) which is formed on the lever itself.

As shown in FIGS. 5–8, a small basin (12) is inserted on the base (4). For safety rules the basin must be larger than the drum which is above it in order to collect the liquid accidentally lost or spilled.

With the constructive solutions described hereinabove it is, however, necessary that the basin (12) move laterally when the drum moves again to the vertical position.

Figure 5:
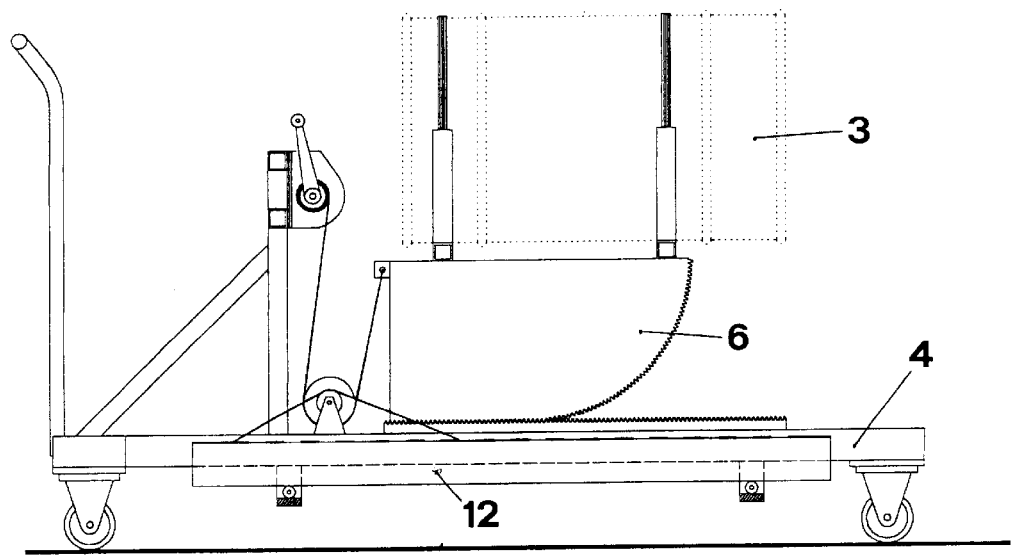
FIGS. 5 and 6 show frontal elevational views of a first system for moving the basin.
Figure 6:
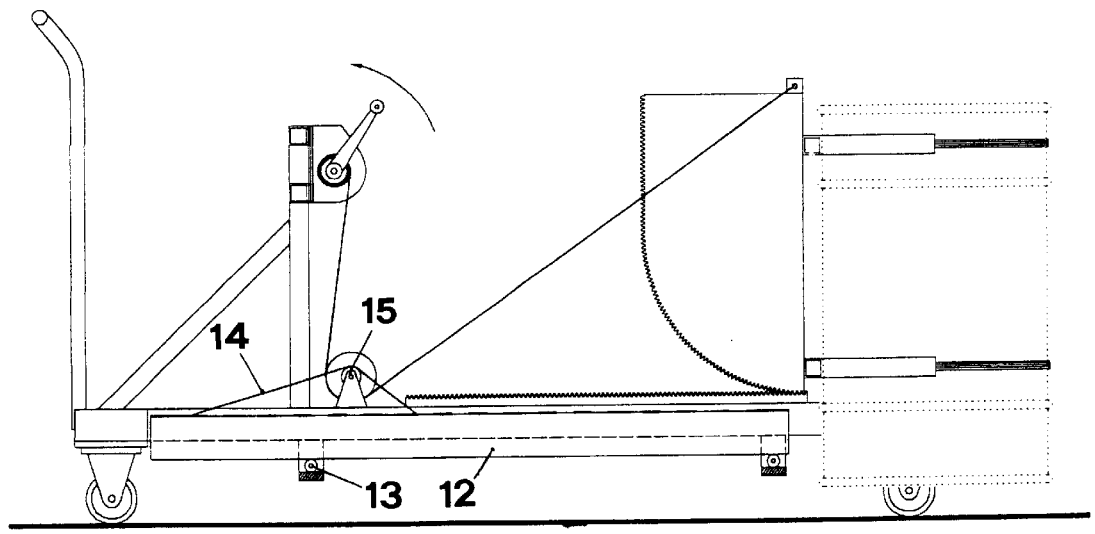

As shown in FIGS. 5 and 6, according to the first embodiment, the alternative rectilinear sliding is obtained by providing that the basin (12) slide on rollers (13) applied on the frame of the base and its alternative motion is obtained by means of a strap (14) which engages itself on pinion (15). This pinion is coaxial with the return roll (9) of the winch.

Figure 7:
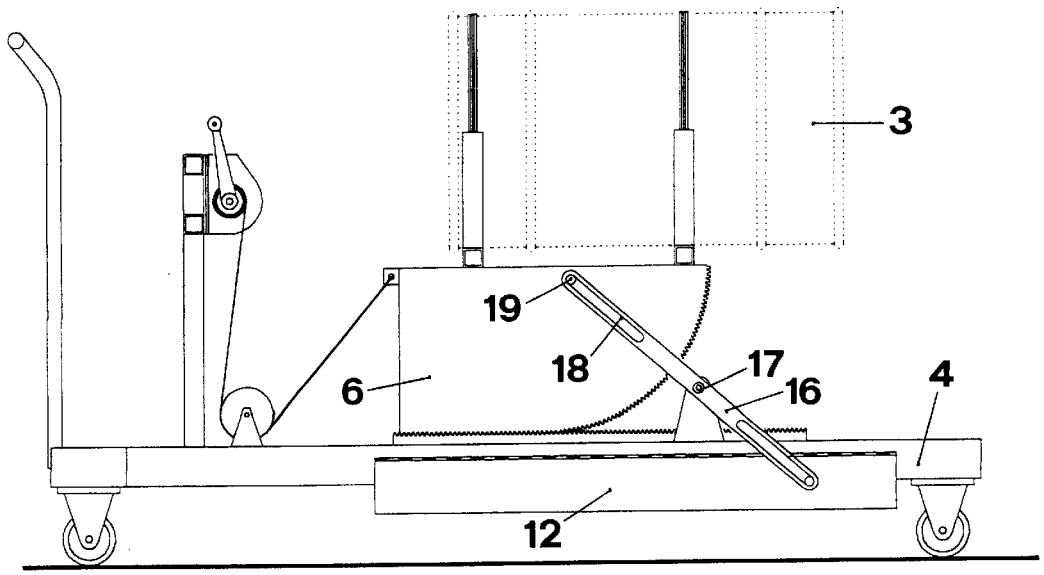
FIGS. 7 and 8 show elevational frontal views of a second system for moving the basin.
Figure 8:
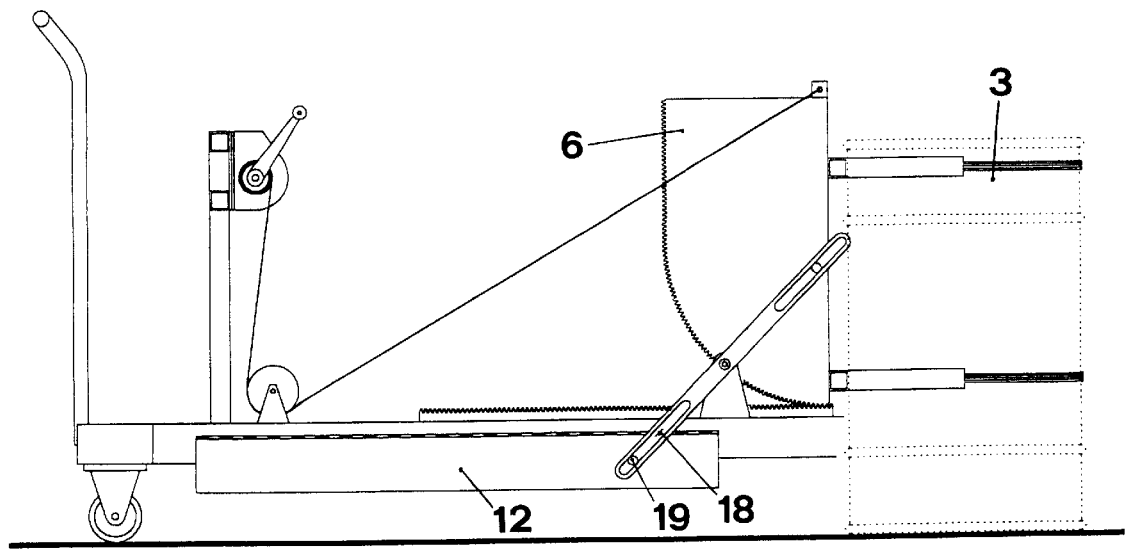

As seen in FIGS. 7 and 8, according to a second embodiment, suitable for basins of relevant weight and dimensions, the alternative rectilinear sliding is obtained by means of a shaft (16) which together with pin (17) has a fulcrum on base (4) and engages by means of lozenges or guides (18) with corresponding pawls (19). The pawls are integral respectively with basin (12) and shoulder (6). In this manner the horizontal pivoting motion of the shoulder is transmitted to the alternative rectilinear motion of the basin.

Obviously embodiments different from the described embodiments are possible, as a function of the dimensions of the drums and particular mechanical components such as for instance an automatic winch or other equivalent mechanism without departing from the scope of the claims defined hereinbelow.

What is claimed is:

1. An ecological carriage for a liquid containing drum, said carriage comprising:
   a base mounted on wheels;
   a metal support structure mounted on said base for supporting the drum in a horizontal position on said carriage, said support structure being adapted for rotation so as to move said drum from a horizontal position to a vertical position and vice versa; and
   a basin mounted on said base disposed beneath said drum to collect liquid spilled during decanting or due to rupture of the drum, said basin being slidably movable from a position completely under said drum when said drum is supported by said support structure in the horizontal position to a lateral position so as to permit said drum to be moved to the vertical position by the rotation of said support structure.

2. The ecological carriage as defined in claim 1, wherein said support structure is of the horizontal pivoting type.

3. The ecological carriage as defined in claim 1, wherein the mounting of said support structure on said base includes two shoulders (6) shaped with an arcuate profile (7) so that said support structure can be horizontally pivoted to a maximum of 90°.

4. The ecological carriage as defined in claim 3, wherein the horizontal pivoting motion of said support structure results from said drum being mounted so that its center of gravity is always displaced more externally than the center of gravity of said shoulders.

5. The ecological carriage as defined in claim 4, wherein the horizontal pivoting of said support structure is produced means of two crank gears comprising first and second gas pistons (20, 21) act on first and second arms or levers (22, 23) respectively, said pistons (20, 21) and arms (22, 23) being anchored on said base.

6. The ecological carriage as defined in claim 5, wherein the initial angular rotation of said support structure produced by the crank gear comprising said first gas piston (20) and said first lever (22) pushing on a pin (24) on said shoulders (6).

7. The ecological carriage as defined in claim 5, wherein said crank gear comprised of said second gas piston (21) and said second lever (23) regulates the entire action of horizontal pivoting of said support structure by means of a pawl (25) formed on said shoulders (6) slidingly engaged within a guide slot (26) formed on said second lever (23).

8. The ecological carriage as defined in claim 3, wherein the horizontal pivoting motion of said support structure is regulated by a winch (8) mounted on said base and connected by means of a return roller (9) to a nib (10) formed on said shoulders (6).

9. The ecological carriage as defined in claim 8, wherein said basin slides on rollers (15) and is rectilinearly movable from a position completely under said horizontally positioned drum to a lateral position so as to permit said drum to be moved to the vertical position by the rotation of said support structure by means of a strap (14) engaged on a pinion (15) coaxial with said return roller (9) of said winch (8).

10. The ecological carriage as defined in claim 8, wherein said basin is rectilinearly movable from a position completely under said horizontally positioned drum to a lateral position so as to permit said drum to be moved to a vertical position by the rotation of said support structure by means of a shaft (16) pivotally mounted on said base and engaging by means of guide slots (18) with corresponding pawls (19) formed respectively on paid basin and one of said shoulders (6) so that horizontally pivoting motion of said shoulders is transmitted to rectilinear motion of said basin.

11. The ecological carriage as defined in claim 5, wherein the arcuate profile (7) of paid shoulders (6) are provided with gear teeth which engage with a fixed rack (11) on said base so that said shoulders (6) are rotatable so as to horizontally pivot said support structure.

* * * * *